United States Patent
Kim et al.

(10) Patent No.: US 11,720,750 B1
(45) Date of Patent: Aug. 8, 2023

(54) METHOD FOR QA WITH MULTI-MODAL INFORMATION

(71) Applicant: ActionPower Corp., Seoul (KR)

(72) Inventors: Kyung Ho Kim, Seoul (KR); Jihwa Lee, Seoul (KR)

(73) Assignee: ACTIONPOWER CORP.

( * ) Notice: Subject to any disclaimer, the term of this patent is extended or adjusted under 35 U.S.C. 154(b) by 0 days.

(21) Appl. No.: 17/954,150

(22) Filed: Sep. 27, 2022

(30) Foreign Application Priority Data

Jun. 28, 2022 (KR) .................. 10-2022-0078750

(51) Int. Cl.
*G06F 40/279* (2020.01)
*G06V 10/77* (2022.01)
*G06V 20/62* (2022.01)

(52) U.S. Cl.
CPC ........ *G06F 40/279* (2020.01); *G06V 10/7715* (2022.01); *G06V 20/63* (2022.01)

(58) Field of Classification Search
CPC ... G06F 40/279; G06V 10/7715; G06V 20/63
USPC .......................................................... 704/9
See application file for complete search history.

(56) References Cited

U.S. PATENT DOCUMENTS

| | | | |
|---|---|---|---|
| 11,302,360 B1 * | 4/2022 | Gupta | ........... G11B 27/102 |
| 2012/0117051 A1 | 5/2012 | Liu et al. | |
| 2019/0085823 A1 | 3/2019 | Hovgaard et al. | |
| 2021/0166102 A1 | 6/2021 | Kim et al. | |

FOREIGN PATENT DOCUMENTS

| | | |
|---|---|---|
| KR | 20010012261 A | 2/2001 |
| KR | 20030014804 A | 2/2003 |
| KR | 1020030014804 A | 10/2004 |
| KR | 20090090613 A | 8/2009 |
| KR | 101273646 B1 | 7/2012 |
| KR | 1020130142121 A | 12/2013 |
| KR | 20180059347 A | 6/2018 |
| KR | 102034646 B1 | 6/2019 |
| KR | 102043563 B1 | 11/2019 |
| KR | 1020210067865 A | 6/2021 |

OTHER PUBLICATIONS

Kizil Tepe et al., A novel keyframe extraction method for video classification using deep neural networks, Neural Computing and Applications, S.I: IWANN 2019, https://doi.org/10.1007/s00521-021-06322-x, 12 pgs.

Xiao et al., Video as Conditional Graph Hierarchy for Multi-Grandular Question Answering, Associate for the Advancement of Artificial Intelligence (www.aaai.org) Copyright 2022, 9 pgs.

* cited by examiner

*Primary Examiner* — Thierry L Pham
(74) *Attorney, Agent, or Firm* — Fish IP Law, LLPP (57) ABSTRACT

Disclosed is a method for performing QA with multi-modal information. Specifically, according to the present disclosure, a computing device determines core text information from a video based on question data, determines core object information or core frame information from the video based on the core text information, and performs QA for the video based on the determined core text information, and the determined core object information or core frame information by utilizing a QA model.

12 Claims, 6 Drawing Sheets

METHOD FOR QA WITH MULTI-MODAL INFORMATION

CROSS-REFERENCE TO RELATED APPLICATIONS

This application claims priority to and the benefit of Korean Patent Application No. 10-2022-0078750 filed in the Korean Intellectual Property Office on Jun. 28, 2022, the entire contents of which are incorporated herein by reference.

TECHNICAL FIELD

The present disclosure relates to a method for question answering (QA) with multi-modal information, and more particularly, to a method for QA by considering characteristics of each modality in a multi-modal environment.

BACKGROUND ART

Recently, due to the remarkable development in the field of machine learning, QA studies using machine learning models have been actively conducted in AN artificial intelligence field. QA is conducted by a scheme in which the machine learning model generates input data and question data of a user. In recent years, in order to enable deeper understanding of a situation, a method for not using data of single modality such as a text or a text as the input data, but utilizing multi-modal information such as video including all of the text and the image, and audio data has been studied.

In the QA using the multi-modal information, in the related art, a correlation between modes is determined by an attention technique, but such a method presents a disadvantage that efficiency deteriorates between modalities having different features. Therefore, a method has emerged which converts the multi-modal information to have a feature and a dimension in order to increase performance of a model. However, according to this method, a huge calculation amount is required in QA having video with a relatively large data size as input data. When the calculation amount is large as such, available resources are reduced, which may act as a factor which reduces the performance of the model.

Therefore, there is a demand of the art for a method for performing accurate QA by reducing the calculation amount and ultimately increasing the performance so as for the model to design a sufficient attention in the QA using the multi-modal information.

Korean Patent Registration No. 1273646 discloses Method and System for Indexing and Searching in Multi-Modality Data.

SUMMARY OF THE INVENTION

The present disclosure is contrived in response to the background art, and has been made in an effort to determining core modality information (e.g., core text information, corer object information, core frame information, etc.) in a multi-modal environment, and inputs the core modality information in a QA model to perform QA.

Meanwhile, a technical problem to be solved by the present disclosure is not limited to the above-mentioned technical problem, and various technical problems can be included within the scope which is apparent to those skilled in the art from contents to be described below.

An embodiment of the present disclosure provides a method for performing QA with multi-modal information. The method may include: determining core text information from a video based on question data; determining core object information or core frame information from the video based on the core text information; and performing QA for the video based on the determined core text information, and the determined core object information or core frame information by utilizing a QA model.

In an alternative embodiment, the determining of the core text information from the video based on the question data may include acquiring the question data, identifying a text included in the video, extracting one or more keywords from the text; and determining the core text information based on one or more keywords.

In an alternative embodiment, the extracting of one or more keywords from the text may include extracting a keyword related to the question data in the text.

In an alternative embodiment, the extracting of the keyword related to the question data in the text includes extracting an important in a field to which the question data belongs from a database, and extracting a keyword related to the question data in the text based on the extracted important word.

In an alternative embodiment, the extracting of the keyword related to the question data in the text may include determining a word which appears at a predetermined frequency or more in the text as the important; and extracting the keyword related to the question data based on the extracted important word.

In an alternative embodiment, the determining of the core object information or the core frame information from the video based on the core text information may include determining a core video interval from the video based on the core text information, determining the core object information based on analysis of frames included in the core video interval, and determining the core frame information based on analysis of the core object information.

In an alternative embodiment, the determining of the core object information based on the analysis of the frames included in the core video interval may include when the frames included in the core video interval include the same object, determining information on the corresponding object as the core object information.

In an alternative embodiment, the determining of the core frame information based on the analysis of the core object information may include determining information on a first frame where the core object appears as the core frame information.

In an alternative embodiment, the determining of the core object information or the core frame information from the video based on the core text information may include determining a core video interval from the video based on the core text information, determining the core frame information based on the analysis of the objects included in the core video interval, and determining the core object information based on the analysis of the core frame information.

In an alternative embodiment, the determining the core frame information based on the analysis of the objects included in the core video interval may include when a similarity of objects included in continuous frames included in the core video interval is less than a predetermined value, determining information on the corresponding frames as the core frame information.

In an alternative embodiment, the determining the core object information based on the analysis of the core frame information may include determining information on the objects included in the frames determined as the core frame as the core object information.

In an alternative embodiment, the QA model may include one or more embedding layers, and the performing QA for the video based on the determined core text information, and the determined core object information or core frame information by utilizing the QA model may include converting the core text information, the core object information, and the core frame information into information having the same feature and dimension by utilizing the embedding layer, and generating answer data based on the information having the same feature and dimension by utilizing the QA model.

Another embodiment of the present disclosure provides a computer program for performing QA with multi-modal information. The program may include: an operation of determining core text information from a video based on question data; an operation of determining core object information or core frame information from the video based on the core text information; and an operation of performing QA for the video based on the determined core text information, and the determined core object information or core frame information by utilizing a QA model.

Still another embodiment of the present disclosure provides a computing device performing QA with multi-modal information. The computing device may include: a processor including one or more cores; a network unit receiving question data of a user; and a memory, in which the processor is configured to determine core text information from a video based on question data, determine core object information or core frame information from the video based on the core text information, and perform QA for the video based on the determined core text information, and the determined core object information or core frame information by utilizing a QA model.

According to an embodiment of the present disclosure, a method for QA for a user from multi-modal information can be provided.

BRIEF DESCRIPTION OF THE DRAWINGS

The following drawings accompanied to be used for describing an embodiment of the present disclosure are just some of the embodiments of the present disclosure, and those skilled in the art to which the present disclosure belongs (hereinafter, referred to as "normal technicians") can acquire other drawings based on the drawings without an effort to reach a new invention.

DETAILED DESCRIPTION

The present disclosure discloses a method for determining core text information, core object information, and core frame information from a video based on question data of a user, and inputting the corresponding information in a QA model by using an embedding layer to perform the QA for the video.

Hereinafter, various embodiments are described with reference to the drawings. In the present specification, various descriptions are presented for understanding the present disclosure. However, it is obvious that the embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable medium having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application.

However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

In the present disclosure, a network function, an artificial neural network, and a neural network may be interchangeably used.

Figure 1:
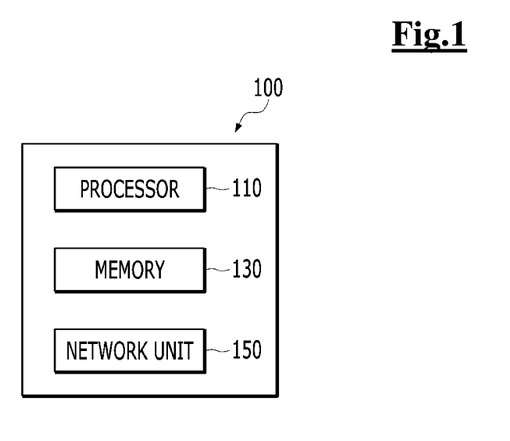
FIG. 1 is a block diagram of a computing device for performing QA using multi-modal information according to an embodiment of the present disclosure.

FIG. 1 is a block diagram of a computing device for generating data based on input data according to an embodiment of the present disclosure.

The configuration of a computing device 100 illustrated in FIG. 1 is merely a simplified example. In the embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an embodiment of the present disclosure. According to the embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network.

At least one of the CPU, GPGPU, and TPU of the processor 110 may process training of a network function. For example, the CPU and the GPGPU may process training of the network function and data classification by using a network function together. Further, in the embodiment of the present disclosure, the training of the network function and the data classification by using a network function may be processed by using the processors of the plurality of computing devices together. Further, the computer program executed in the computing device according to the embodiment of the present disclosure may be a CPU, GPGPU, or TPU executable program.

According to an embodiment of the present disclosure, the processor 110 may determine the core text information from the video based on question data.

The processor 110 may extract one or more keywords related to question data from a text included in the text and determine the core text information based on the keyword, in order to determine the core text information. The text included in the video is a text which may be identified in a subtitle, a caption, and an image of the video.

The processor 110 may identify the text included in the video in order to extract one or more keywords related to the question data from the text. Technology that recognizes the text, such as OCR, etc., may be used to identify the text included in the video, but the present disclosure is not limited to such text identification technology, and various methods known to the normal technicians may be used.

According to an embodiment of the present disclosure, the processor 110 may extract an important word of a field to which the question data belongs from an external database, e.g., a database such as a word dictionary in order to extract the keyword, and extract the keyword related to the question data from the text based on the extracted important word. A method for extracting the keyword related to the question data from the text based on the important word may be a method for extracting the word included in the text among the important words and also be a method for extracting the word included in the text among the important words, and a synonym of the corresponding word.

According to an embodiment of the present disclosure, the processor may determine a word which appears at a predetermined frequency or more in the text included in the video as the important word, and extract the keyword related to the question data based on the important word. The method for extracting the keyword related to the question data based on the important word may be a method for extracting the word included in the question data among the important words and also be a method for extracting the word included in the question data among the important words, and the synonym of the corresponding word.

In the embodiment, the processor 110 may use a pre-existing model, i.e., a model such as BM25 in order to extract the important and the keyword related the question data, but the keyword extracting method of the present disclosure is not limited thereto.

The processor 110 may also determine the information related to the keyword as the core text information and extend the keyword and determine the extended keyword as the core text information. For example, the processor 110 may designate a sentence including the keyword as a core sentence, and determine information on the corresponding sentence as the core text information. As another example, the processor 110 may designate a paragraph including a predetermined number or more of keywords as a core paragraph, and determine information on the corresponding core sentence as the core text information. As yet another example, the processor 110 may extend the sentence or paragraph including the keyword as a predetermined number or more of sentences or paragraphs to determine information on the corresponding sentence or paragraph as the core text information. However, the present disclosure is not limited to the core text information determining method.

The processor 110 may extract an object for each frame from the video based on technology such as object detection, etc. For example, the processor 110 may extract the object from the video by using an artificial neural network such as Faster-RCNN, etc., but the present disclosure is not limited thereto.

The processor 110 may determine the core frame information from the video based on the core text information. A specific process of determining the core frame information from the video will be described with reference to FIG. 4.

The processor 110 may determine the core object information from the video based on the core text information. A specific process of determining the core object information from the video will be described with reference to FIG. 5.

In the present disclosure, the QA model may be a machine learning based artificial neural network model. The QA model may include one or more embedding layers.

The processor 110 may convert the core text information, the core object information, and the core frame information into information having the same feature and dimension by utilizing the embedding layer included in the QA model. Different modality information included in the video is converted into the same feature and dimension to increase the performance of the QA model using an attention. Since only important data with the feature of the video, such as the core text, the core object, the core frame, etc., is embedded without embedding all data included in the video, a model may be designed so that a calculation amount is significantly reduced, and the attention occurs more easily. Ultimately, the present disclosure may lead to a remarkable effect of increasing the performance of the model.

According to an embodiment of the present disclosure, the processor 110 may perform the QA by utilizing the QA model. Since the present disclosure leads to the remarkable effect of increasing the performance of the model as described above, a range of the question which the QA model may appreciate may be widened and accuracy of generated answer data may be enhanced.

According to the embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may use any type of wired/wireless communication system.

The technologies described in the present specification may be used in other networks, as well as the foregoing networks.

Figure 2:
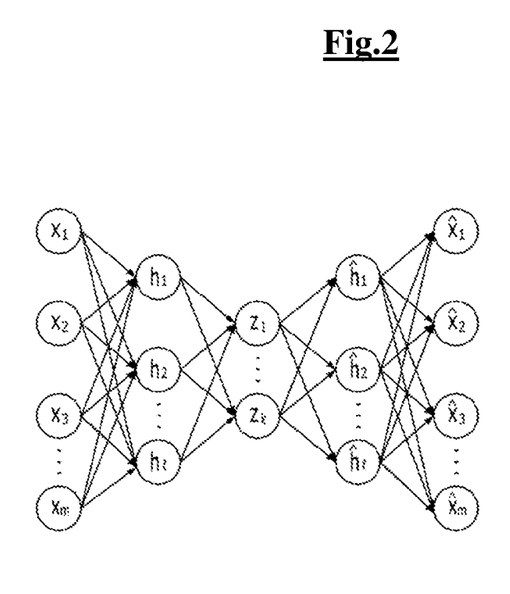
FIG. 2 is a schematic diagram illustrating a network function according to an embodiment of the present disclosure.

FIG. 2 is a schematic diagram illustrating a network function according to the embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
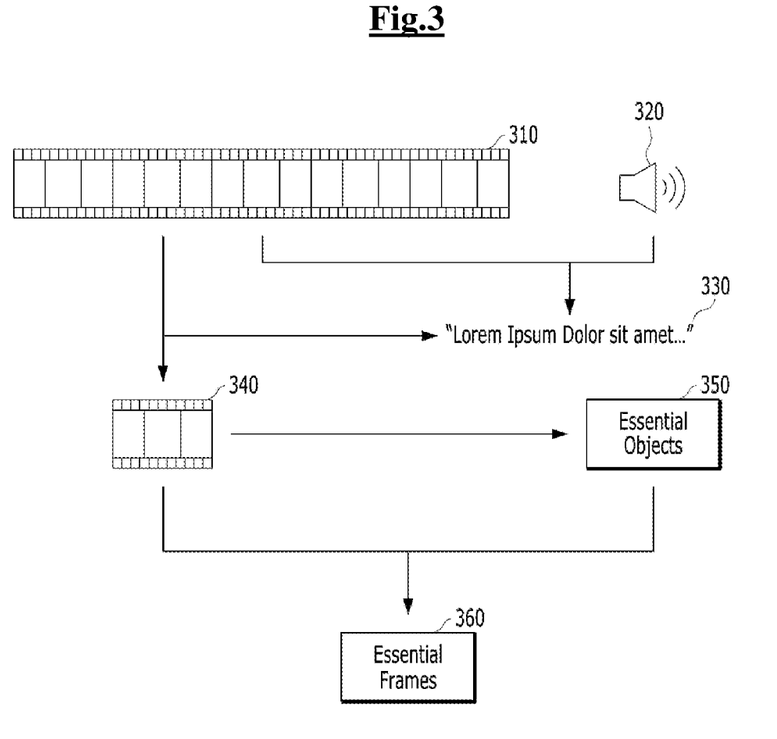
FIG. 3 is a conceptual diagram for a method for generating core frame information from a video according to an embodiment of the present disclosure.

FIG. 3 is a conceptual diagram for a method for generating core frame information from a video according to an embodiment of the present disclosure.

The processor 110 may determine core text information 330 from a video 310 based on question data 320. The method for determining the core text information 330 from the video 310 based on the question data 320 is described with reference to FIG. 1.

FIG. 3 is a conceptual diagram for a method for generating core frame information from a video according to an embodiment of the present disclosure.

The processor 110 may determine a core video interval 340 from the video 310 based on the core text information 330. For example, the processor 110 may determine an interval including the core text information 330 as the core video interval 340. Specifically, when an interval of 3:34 to 3:55 of the video is "Lorem Ipsum Dolor sit amet", and information on "Lorem Ipsum Dolor sit amet" corresponds to the core text, the processor 110 may identify a frame at a time of 3:34 when the subtitle appears and a frame of a time of 3:55 where the subtitle disappears, select all frames between the corresponding frames, and determine a set thereof as the core video interval.

When there is a plurality of core sentences or core paragraphs included in the core text information 330, the processor 110 may determine all of frames including a frame where the core sentence first appears to a frame where a last core sentence appears as the core video interval.

As yet another example, when there is the plurality of core sentences or core paragraphs included in the core text information 330, the processor 110 may identify frames corresponding to a start and an end of the core sentence, respectively, and determine a set of frames between each start frame and each end frame as the core video interval.

The processor 110 may determine the core object information 350 based on analysis of the frames included in the core video interval 340. For example, when the frames included in the core video interval 340 include the same object, the corresponding object may be determined as an object which frequently appears in the core video interval. In this case, there is a high possibility that the object which frequently appears in the core video interval will include an important feature of the corresponding video to determine the information on the corresponding object as the core object information. In this case, the core object may be determined based on intersection over union (IoU). Specifically, when a ratio of "the number of target objects/the total number of objects" exceeds a predetermined value in continuous frames of the core video interval, the processor 110 may determine the target object as the object which frequently appears in the core video interval, and determine the target object as the core object.

The processor 110 may determine the core frame information 360 from the core video interval 340 based on analysis of the core object information 350. For example, the processor 110 may determine the core object, and determine information on the first frame where the core object appears as the core frame information 360. Specifically, when the core object appears in the interval of the time of 3:35 to the time of 3:40 of the video 310, the frame of the time of 3:35 may be determined as the core frame. The method for determining the core frame information from the core object information is not limited to the above-described example.

Figure 4:
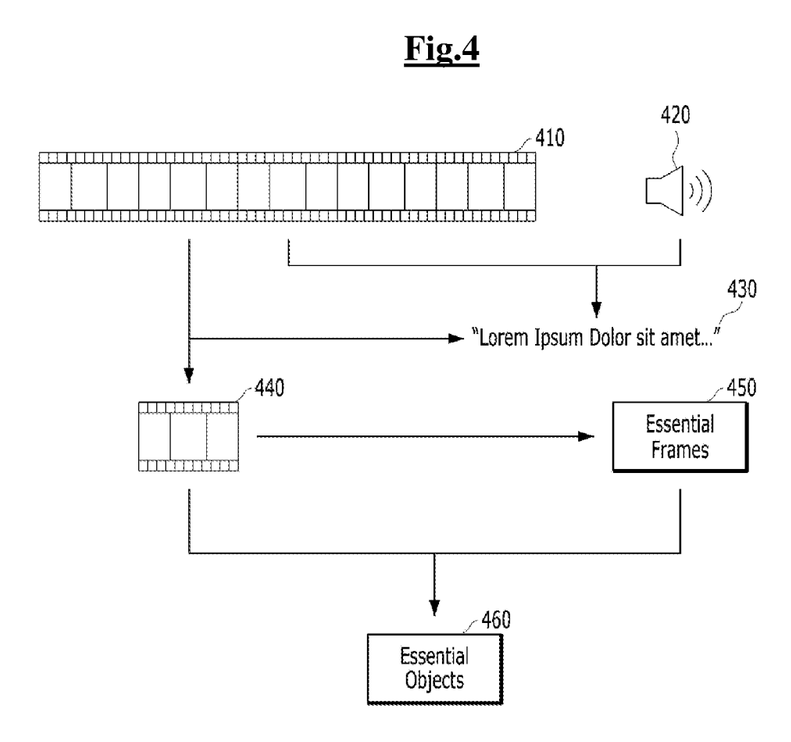
FIG. 4 is a conceptual diagram for a method for generating core object information from the video according to an embodiment of the present disclosure.

FIG. 4 is a conceptual diagram for a method for generating core object information from the video according to an embodiment of the present disclosure.

The processor 110 may determine core text information 430 from a video 410 based on question data 420. The method for determining the core text information 430 from the video 410 based on the question data 420 is described with reference to FIG. 1.

The processor 110 may determine a core video interval 440 from the video 410 based on the core text information 430. For example, the processor 110 may determine an interval including the core text information 430 as the core video interval 440. Specifically, when an interval of 3:34 to 3:55 of the video is "Lorem Ipsum Dolor sit amet", and information on "Lorem Ipsum Dolor sit amet" corresponds to the core text information, the processor 110 may identify a frame at a time of 3:34 when the subtitle appears and a frame of a time of 3:55 where the subtitle disappears, select all frames between the corresponding frames, and determine a set thereof as the core video interval.

When there is a plurality of core sentences or core paragraphs included in the core text information 430, the processor 110 may determine all of frames including a frame where the core sentence first appears to a frame where a last core sentence appears as the core video interval.

As yet another example, when there is the plurality of core sentences or core paragraphs included in the core text information 430, the processor 110 may identify frames corresponding to a start and an end of the core sentence, respectively, and determine a set of frames between each start frame and each end frame as the core video interval.

The processor 110 may determine the core frame information 450 based on analysis of the objects included in the core video interval 440. For example, when a similarity of objects included in continuous frames included in the core video interval is less than a predetermined threshold, it may be regarded that a rapid fluctuation occurs in the objects included in the corresponding frames. Further, it may be regarded that a time when the objects included in the frames rapidly fluctuate corresponds to a transition time of the video and a frame before and after the transition time includes the important feature of the video. Therefore, information on the corresponding frames may be determined as the core frame information.

Specifically, when "the number of common objects/the total number of objects" is equal to or more than a threshold in the continuous frames of the core video interval, all of the corresponding frames may be determined as frames having a similar meaning. Therefore, one frame of the frames having the similar meaning may be determined as the core frame. Meanwhile, when "the number of common objects/the total number of objects" is less than the threshold in the continuous frames of the core video interval, it is determined that a large change occurs between the objects included in the corresponding frames to determine all of the corresponding frames as the core frame. In this case, the number of common objects in the continuous frames may be determined based on the intersection over union (IoU).

The processor 110 may determine the core object information 460 from the core video interval 440 based on analysis of the core frame information 450.

For example, the processor 110 may determine the core frame, and determine information on all objects included in the frames determined as the core frame as the core object information. Specifically, in an example in which the objects included in the frame rapidly fluctuates, a case where core frame A includes {a, b, c} objects and core frame B includes {a, d, e, f, g} objects may be assumed. In this case, the core object may become {a, b, c, d, e, f} which is a union of sets of the objects included in corer frame A and core frame B. Therefore, information on a, b, c, d, e, f may be determined as the core object information. The method for determining the core object information from the core frame information is not limited to the above-described example.

Figure 5:
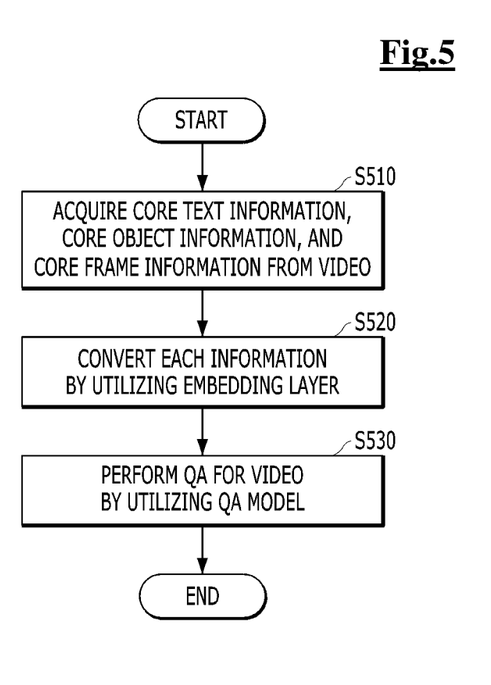
FIG. 5 is a flowchart illustrating a process of performing QA for the video according to an embodiment of the present disclosure.

FIG. 5 is a flowchart illustrating a process of performing QA for the video according to an embodiment of the present disclosure.

According to FIG. 5, the process of performing QA from the video according to the present disclosure may include a step of acquiring core text information, core object information, and core frame information from the video (S510), a step of converting each information by utilizing an embedding layer (S520), and a step of performing the QA for the video by utilizing a QA model (S530).

In the present disclosure, the QA model may be an artificial neural network model in which an attention structure is added to a neural network having a long-short term memory (LSTM) structure, and may be an artificial neural network model utilizing a transformer. However, the present disclosure is not limited to the type of artificial neural network model.

In step S510, the processor 110 may acquire the core text information, the core object information, and the core frame information from the video. A specific method for acquiring the core text information, the core object information, and the core frame information is described with reference to FIGS. 1 to 3.

In step S520, a processor 110 may convert each information, i.e., the core text information, the core object information, and the core frame information into information having the same feature and dimension by utilizing the embedding layer included in the QA model. Information having different modalities is converted into the information having the same feature and dimension, and as a result, the model may better determine a relationship between the respective modalities.

In step S530, the processor 110 may perform QA for the video by utilizing the QA. In the case of the present disclosure, only the core sentence information, the core frame information, and the core object information including important features of the video are embedded without embedding and inputting all information included in the video to the QA model to innovatively reduce a calculation amount and maintain the feature included in the video as it is. Therefore, ultimately, there is an effect that the performance of the QA model is increased, and the accuracy of answer data is remarkably increased.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 6:
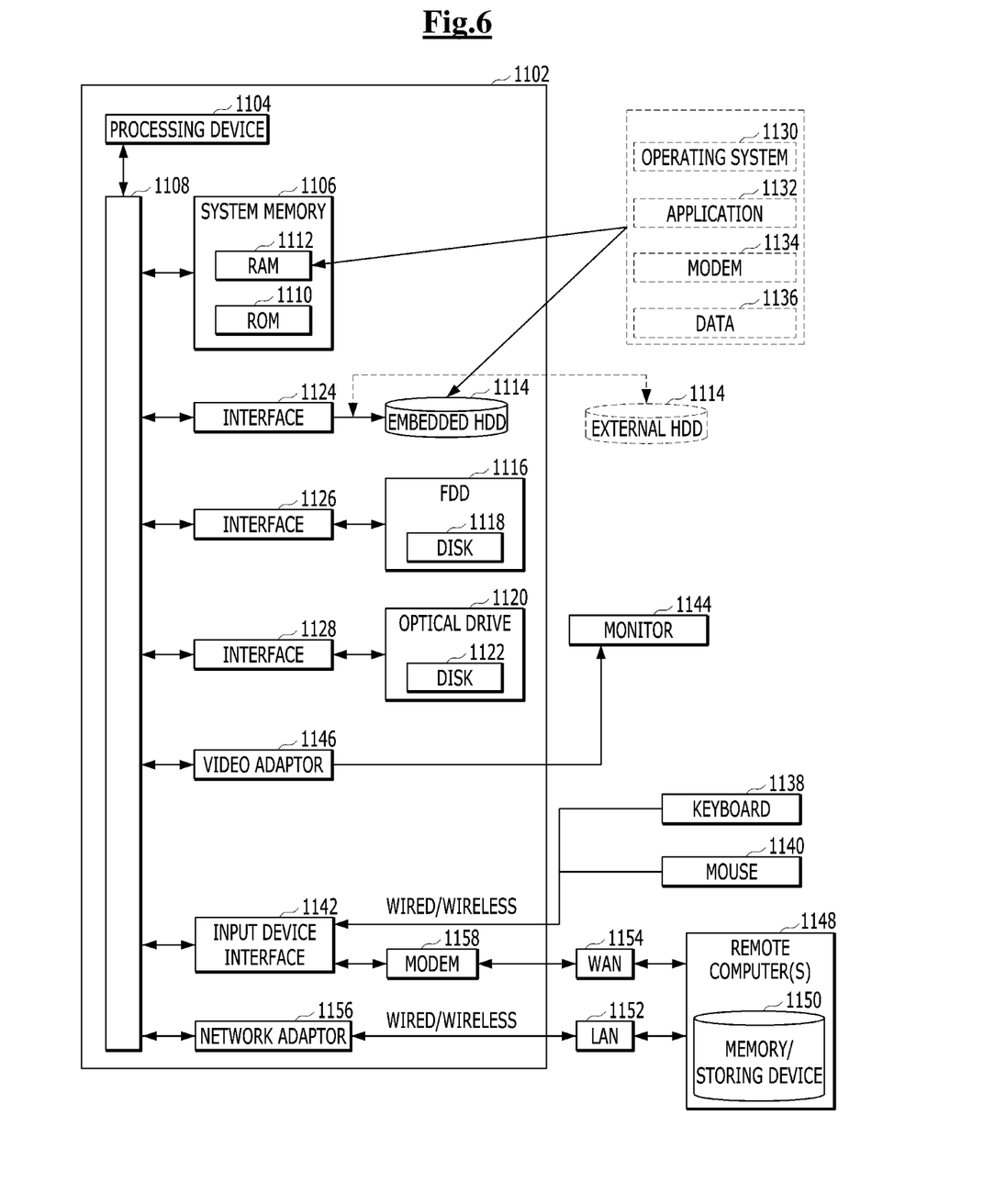
FIG. 6 is a simple and normal schematic view of an computing environment in which embodiments of the present disclosure may be implemented.

FIG. 6 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multiprocessor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for performing question answering (QA) with multi-modal information, the method performed by a computing device, the method comprising:
    determining core text information from a video based on question data;
    determining core object information or core frame information from the video based on the core text information; and
    performing QA for the video based on the determined core text information, and the determined core object information or core frame information by utilizing a QA model,
    wherein the determining core text information from the video based on question data includes:
    extracting a keyword related to the question data in the text included in the video,
    wherein the extracting the keyword related to the question data in the text included in the video includes:
    extracting an important word in a field to which the question data belongs from a database, and
    extracting the keyword related to the question data in the text based on the extracted important word,
    wherein the QA model includes one or more embedding layers, and
    the performing QA for the video based on the determined core text information, and the determined core object information or core frame information by utilizing a QA model includes:
    converting the core text information, the core object information, and the core frame information into information having the same feature and dimension by utilizing the embedding layer, and
    generating answer data based on the information having the same feature and dimension by utilizing the QA model.

2. The method of claim 1, wherein the determining of the core text information from the video based on the question data includes
    acquiring the question data,
    identifying a text included in the video,
    extracting one or more keywords from the text; and
    determining the core text information based on one or more keywords.

3. The method of claim 2, wherein the extracting of one or more keywords from the text includes
extracting a keyword related to the question data in the text.

4. The method of claim 3, wherein the extracting of the keyword related to the question data in the text includes
determining a word which appears at a predetermined frequency or more in the text as the important; and
extracting the keyword related to the question data based on the extracted important word.

5. The method of claim 1, wherein the determining of the core object information or the core frame information from the video based on the core text information includes
determining a core video interval from the video based on the core text information,
determining the core object information based on analysis of frames included in the core video interval, and
determining the core frame information based on analysis of the core object information.

6. The method of claim 1, wherein the determining core object information or core frame information from the video based on the core text information includes:
determining a core video interval from the video based on the core text information,
when the frames included in the core video interval include the same object, determining information on the corresponding object as the core object information.

7. The method of claim 5, wherein the determining of the core frame information based on the analysis of the core object information includes
determining information on a first frame where the core object appears as the core frame information.

8. The method of claim 1, wherein the determining of the core object information or the core frame information from the video based on the core text information includes
determining a core video interval from the video based on the core text information,
determining the core frame information based on the analysis of the objects included in the core video interval, and
determining the core object information based on the analysis of the core frame information.

9. The method of claim 1, wherein the determining of the core object information or the core frame information from the video based on the core text information includes:
determining a core video interval from the video based on the core text information,
when a similarity of objects included in continuous frames included in the core video interval is less than a predetermined value, determining information on the corresponding frames as the core frame information.

10. The method of claim 8, wherein the determining of the core object information or the core frame information from the video based on the core text information further includes:
determining the core object information based on the analysis of the core frame information,
wherein the determining the core object information based on the analysis of the core frame information includes
determining information on the objects included in the frames determined as the core frame as the core object information.

11. A computer program stored in a non-transitory computer readable storage medium including instructions which allow a computing device to perform operations, wherein the operations comprise:

an operation of determining core text information from a video based on question data;
an operation of determining core object information or core frame information from the video based on the core text information; and
an operation of performing QA for the video based on the determined core text information, and the determined core object information or core frame information by utilizing a QA model,
wherein the QA model includes one or more embedding layers, and
the operation of performing QA for the video includes:
an operation of converting the core text information, the core object information, and the core frame information into information having the same feature and dimension by utilizing the embedding layer, and
an operation of generating answer data based on the information having the same feature and dimension by utilizing the QA model,
wherein the operation of determining the core text information from a video based on question data includes:
an operation of extracting a keyword related to the question data in the text included in the video,
wherein the operation of extracting the keyword related to the question data in the text included in the video includes:
an operation of extracting an important word in a field to which the question data belongs from a database, and
an operation of extracting the keyword related to the question data in the text based on the extracted important word.

12. A computing device comprising:
a processor including one or more cores;
a network unit receiving question data of a user; and
a memory,
wherein the processor is configured to:
determine core text information from a video based on question data,
determine core object information or core frame information from the video based on the core text information, and
perform QA for the video based on the determined core text information, and the determined core object information or core frame information by utilizing a QA model
wherein the QA model includes one or more embedding layers, and
performing QA for the video includes:
converting the core text information, the core object information, and the core frame information into information having the same feature and dimension by utilizing the embedding layer, and
generating answer data based on the information having the same feature and dimension by utilizing the QA model,
wherein the determining the core text information from the video based on question data includes:
extracting a keyword related to the question data in the text included in the video,
wherein extracting the keyword related to the question data in the text included in the video includes:
extracting an important word in a field to which the question data belongs from a database, and
extracting the keyword related to the question data in the text based on the extracted important word.

* * * * *